United States Patent [19]

Kim

[11] Patent Number: 5,789,936
[45] Date of Patent: Aug. 4, 1998

[54] CIRCUIT FOR SENSING A COMMUNICATION STATE

[75] Inventor: Young-Min Kim, Seoul, Rep. of Korea

[73] Assignee: Daewoo Electronics Co., Ltd., Seoul, Rep. of Korea

[21] Appl. No.: 703,009

[22] Filed: Aug. 26, 1996

[30] Foreign Application Priority Data

Aug. 28, 1995 [KR] Rep. of Korea .................. 95-26842

[51] Int. Cl.⁶ .................................................. H03K 17/16
[52] U.S. Cl. ............................. 326/21; 326/93; 370/85.1
[58] Field of Search ..................... 326/21, 93; 370/85.1, 370/85.2; 395/275

[56] References Cited

U.S. PATENT DOCUMENTS

| | | | |
|---|---|---|---|
| 5,199,107 | 3/1993 | Ozawa | 395/325 |
| 5,287,458 | 2/1994 | Michael et al. | 395/250 |
| 5,559,502 | 9/1996 | Schutte | 370/54 X |
| 5,577,260 | 11/1996 | Sakuma | 395/800 |

Primary Examiner—David R. Hudspeth
Attorney, Agent, or Firm—Beveridge, DeGrandi, Weilacher & Young LLP

[57] ABSTRACT

A circuit for sensing a communication state equipped with a signal detecting circuit and a busy signal generating circuit for sensing different communication states accurately monitors the communication state of a communication network. The circuit includes a signal detecting section for detecting a start signal representing the initiation of data transmission and a stop signal informing of the finish of the data transmission from serial data and serial clock received via a bus, a busy signal generating section for determining a level of a busy signal according to levels of the start signal and stop signal of the signal detecting section, and a microprocessor for controlling the transmission/reception of the serial data and serial clock in accordance with the level of the busy signal of the busy signal generating section. Thus, when data is transmitted to other auxiliary device except the auxiliary devices under being communicated, the destroy of the communicating data is prevented.

5 Claims, 3 Drawing Sheets

1

CIRCUIT FOR SENSING A COMMUNICATION STATE

BACKGROUND OF THE INVENTION

1. Field of the Invention

The present invention relates to a communication network capable of executing data transmission among a plurality of auxiliary equipments, and more particularly to a circuit for sensing a communication state equipped with a signal detecting circuit and a busy signal generating circuit for monitoring different communication states to accurately sense the communication state of a communication network.

2. Description of the Prior Art

A communication network is for transmitting/receiving data by commonly connecting a plurality of auxiliary devices, e.g., a mouse and a keyboard, by means of a bus. The data transmitted via the bus is constituted in serial for minimizing the required number of devices. Such serial communication network is being widely employed in recent years.

As shown in FIG. 1, the serial communication network consists of rings. Here, a reference numeral 100 denotes a bus for transmitting data of a plurality of auxiliary devices, which is provided by two lines for transmitting the data consisting of a serial clock SCL and a serial data SDA. Reference numerals M1, M2 and M3 denote microprocessors for receiving and processing the data transmitted via bus 100, which are respectively included in a plurality of auxiliary devices A, B and C.

That is, the data is transmitted to the plurality of auxiliary devices A, B and C via bus 100, and the transmitted data is supplied to microprocessor M1 of first auxiliary device A, microprocessor M2 of second auxiliary device B and microprocessor M3 of third auxiliary device C, respectively.

The communication between first auxiliary device A and second auxiliary device B will be described as one example. Microprocessor M1 of first auxiliary device A supplies serial clock SCL and serial data SDA as shown in FIG. 2. Then, serial clock SCL and serial data SDA are transmitted to second auxiliary device B via bus 100.

Microprocessor M2 of second auxiliary device B receives serial clock SCL and serial data SDA. In more detail, serial clock SCL of a high potential level is received into microprocessor M2. At the same time, once serial data SDA is triggered to a low potential level, microprocessor M2 prepares for receiving serial data SDA and then processes received serial data SDA.

When third auxiliary device C gets ready for a communication with first auxiliary device A or second auxiliary device B, microprocessor M3 of third auxiliary device C must primarily check a communicating state of the current communication network.

That is, if serial clock SCL of the low potential level or serial data SDA of the low potential level is supplied into microprocessor M3 of third auxiliary device C via bus 100, microprocessor M3 recognizes that the current communication network is in a busy state.

Whereas, if serial clock SCL of the high potential level and serial data SDA of the high potential level are received into microprocessor M3, microprocessor M3 recognizes the current communication network as an idle state and transmits serial data SDA to second auxiliary device B.

At this time, when serial clock SCL and serial data SDA of the high potential level are received into microprocessor M3 while second auxiliary device B is communicated with first auxiliary device A, microprocessor M3 transmits the data. Therefore, the data transmitted from second auxiliary device B to first auxiliary device A and that from third auxiliary device C to second auxiliary device B are destroyed.

SUMMARY OF THE INVENTION

It is an object of the present invention to provide a circuit for sensing a communication state for minimizing data loss by accurately sensing a current communicating state.

To achieve the above object of the present invention, a circuit for sensing communication state includes a signal detecting section for detecting a start signal representing the initiation of data transmission and a stop signal informing of the finish of the data transmission from serial data and serial clock received via a bus. In accordance with levels of the start signal and stop signal of the signal detecting section, a busy signal generating section determines a level of a busy signal. Then, a microprocessor controls the transmission/reception of the serial data and serial clock in accordance with the level of the busy signal of the busy signal generating section.

According to the present invention, the transmitted serial clock and serial data are received into the signal detecting section, and the signal detecting section senses the start signal of high potential level and the stop signal of low potential level. The start signal of high potential level and stop signal of low potential level are supplied to the busy signal generating section which generates the busy signal of high potential level. Then, the busy signal of high potential level is supplied to the microprocessor. Thus, the microprocessor recognizes the current communication network as the busy state, and controls the data not to be transmitted. Consequently, the data transmission during the communication between other auxiliary devices is prevented to protect the data.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Hereinafter, a circuit for sensing a communication state according to an embodiment of the present invention will be described in detail.

Figure 1:
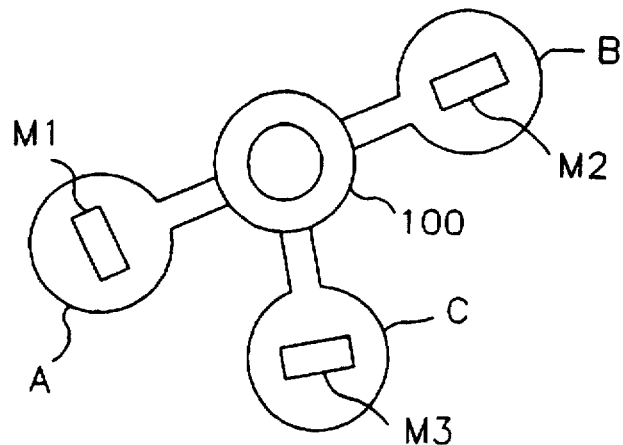
FIG. 1 is a view showing a structure of a general communication network.
Figure 2:
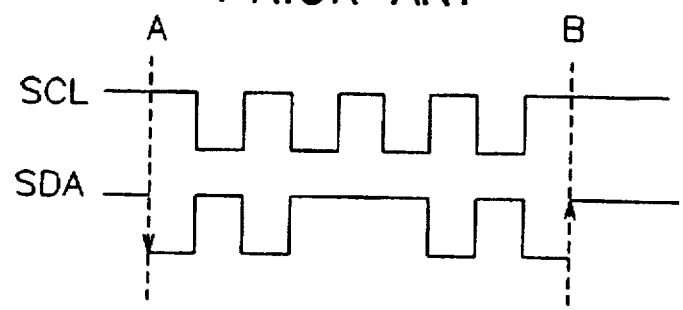
FIG. 2 is a view showing data of FIG. 1.
Figure 3:
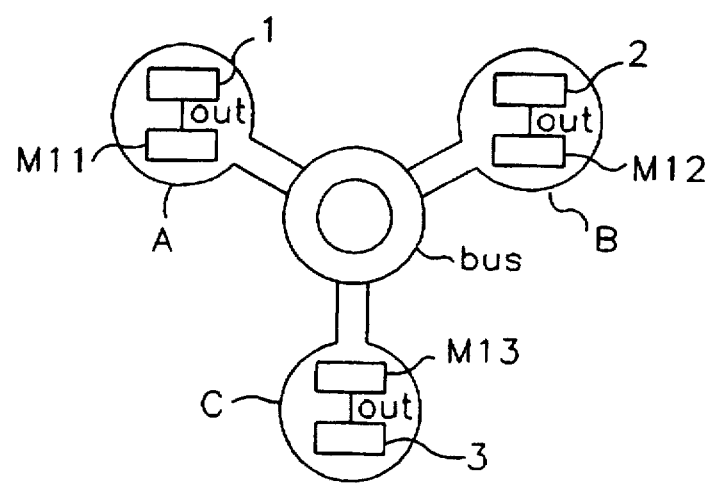
FIG. 3 is a view showing a structure of a communication network according to an embodiment of the present invention.

FIG. 3 is a view showing a structure of a communication network according to an embodiment of the present invention, in which reference numerals 1, 2 and 3 are communication state sensing circuits, respectively, for monitoring the communicating state of a plurality of auxiliary devices. In this embodiment, the plurality of auxiliary devices number is considered three.

3

Figure 4:
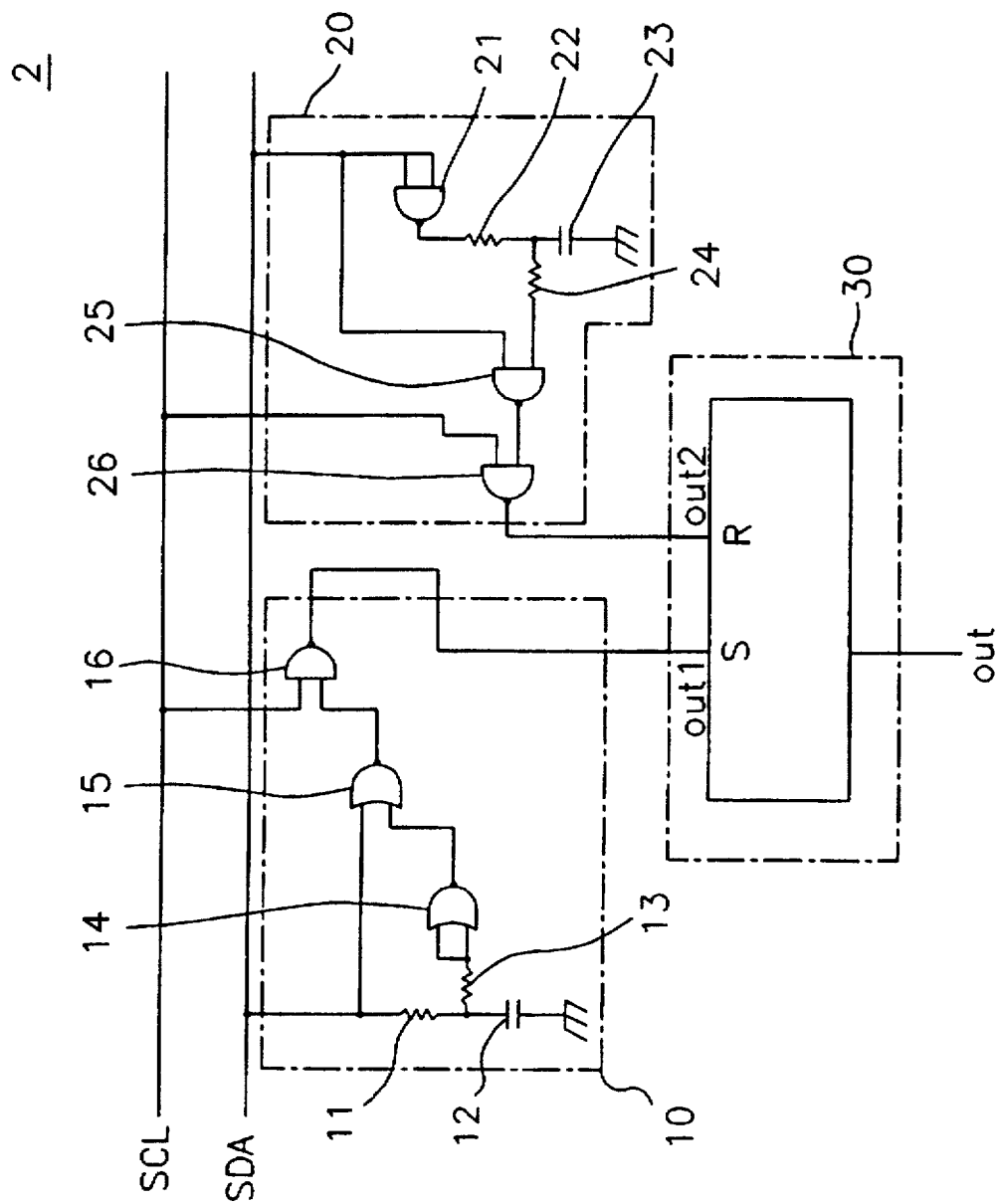
FIG. 4 is a view showing a construction of the communication state sensing circuit shown in FIG. 3.

FIG. 4 is a view showing a construction of communication state sensing circuit 1 of FIG. 3. In FIG. 4, a reference numeral 10 denotes a start signal detecting section for detecting a start signal OUT1 from serial data SDA and a serial clock SCL transmitted via a bus 100, and a reference numeral 20 is a stop signal detecting section for detecting a stop signal OUT2 from serial data SDA and serial clock SCL transmitted via bus 100. A reference numeral 30 denotes a busy signal generating section for producing a busy signal OUT while start signal OUT1 of a high potential level and stop signal OUT2 of a low potential level are provided.

Here, a construction of start signal detecting section 10 will be described in more detail. An output side of a resistor 11 which biases serial data SDA transmitted via bus 100 is connected with one side of a capacitor 12 for precharging and discharging an output signal of resistor 11, so that the output signal of resistor 11 becomes stable. The other side of capacitor 12 is grounded.

Also, the output side of resistor 11 is connected with a resistor 13 for biasing a stable signal of capacitor 12, and an output side of resistor 13 is connected with a first input side and a second input side of a NOR gate 14 for inverting an output signal of resistor 13.

An output side of NOR gate 14 is connected with a first signal from NOR gate 14 and a first input side of a NOR gate 15 for performing an AND operation upon the first signal and serial data SDA and inverting the resultant AND-ed signal. A second input side of NOR gate 15 is supplied with serial data SDA.

An output side of NOR gate 15 is connected with a first input side of a NAND gate 16 for performing the AND operation upon a second signal and serial clock SCL and providing start signal OUT1 by inverting the resultant AND-ed signal. The second input side of NAND gate 16 is supplied with serial clock SCL.

In describing stop signal detecting section 20, an output side of a NAND gate 21 for inverting serial data SDA is connected with an input side of a resistor 22 for biasing an output signal of NAND gate 21. An output side of resistor 22 is connected with one side of a capacitor 23 for precharging and discharging to smooth an output signal of resistor 22. The other side of capacitor 23 is grounded.

One side of capacitor 23 is connected with an input side of a resistor 24 for biasing an output signal of capacitor 23, and an output side of resistor 24 is connected with a first input side of a NAND gate 25 for performing the AND operation upon the output signal of resistor 24 and serial data SDA to invert the resultant AND-ed signal. The second input side of NAND gate 25 is supplied with serial data SDA.

An output side of NAND gate 25 is connected with a first input side of a NAND gate 26 for performing the AND operation upon a third signal from NAND gate 25 and serial clock SCL received via bus 100 by inverting the resultant AND-ed signal to provide stop signal OUT2. The second input side of NAND gate 26 is supplied with serial clock SCL.

Also, busy signal generating section 30 is constituted by a flip-flip which triggers busy signal OUT to the high potential level when start signal OUT1 of high potential level is supplied to a set terminal S and triggers busy signal OUT to the low potential level when stop signal OUT2 of high potential level is received into a reset terminal R.

Additionally, communication state sensing circuits included into second auxiliary device B and third auxiliary device C are furnished to be identical to communication state sensing circuit 1.

4

The circuit for sensing communication state according to the present invention constructed as above will be described below.

Here, a case that first auxiliary device A is to communicate with second auxiliary device B will be described as one example. Once the data having serial data SDA and serial clock SCL is provided from first auxiliary device A, the data is supplied to communicating state sensing circuit 2 of second auxiliary device B and communicating state sensing circuit 3 of third auxiliary device C. Then, communicating state sensing circuits 2 and 3 monitor whether start signal OUT1 is supplied from the data or not to output busy signal OUT of high potential level. Busy signal OUT of high potential level is supplied to microprocessor M12 of second auxiliary device B and microprocessor M13 of third auxiliary device C. Microprocessors M12 and M13 recognize the busy state of the current communication network to be ready for receiving the data, and process the received data.

Thereafter, communicating state sensing circuits 2 and 3 monitor whether stop signal OUT2 is supplied from the data or not to provide busy signal OUT of low potential level. Busy signal OUT of low potential level is supplied to respective microprocessor M12 of second auxiliary device B and microprocessor M13 of third auxiliary device C. Thus, microprocessors M12 and M13 recognize the current communication network being in the idle state to prepare for the transmission of the data and produce the data.

That is, third auxiliary device C recognizes the current communication network as the busy state while first auxiliary device A is communicated with second auxiliary device B. At this time, the reception of the transmitted data is possible but any data cannot be transmitted. Therefore, the data communicated between first auxiliary device A and second auxiliary device B can be protected.

Figure 5:
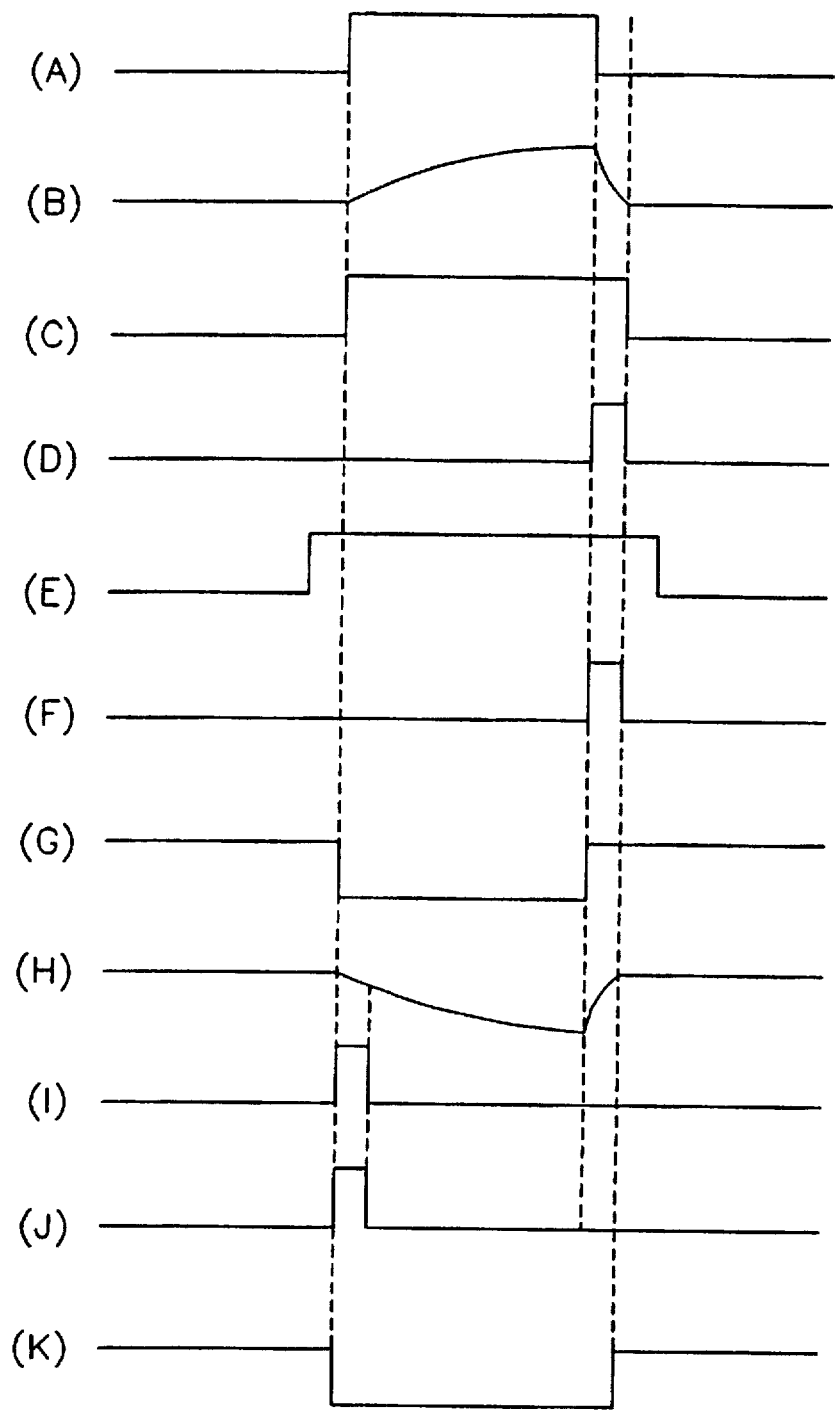
FIGS. 5A to 5K are views showing output signals of respective sections of FIG. 4.

Such an operating process will be described with reference to FIG. 5.

Serial data SDA and serial clock SCL as shown in FIGS. 5A and 5E are provided from microprocessor M11 of first auxiliary device A. Then, serial clock SCL and serial data SDA are respectively supplied to communication state sensing circuit 2 of second auxiliary device B and communication state sensing circuit 3 of third auxiliary device C.

Here, a case that serial data SDA and serial clock SCL are received to communication state sensing circuit 2 will be described.

Once serial data SDA as shown in FIG. 5A is received into communication state sensing circuit 2, serial data SDA is supplied to resistor 11 of start signal detecting section 10, and resistor 11 biases serial data SDA. A bias voltage is supplied to capacitor 12, and capacitor 12 precharges and discharges the bias voltage to produce the smoothing signal. The smoothing signal of capacitor 12 is as shown in FIG. 5B.

The smoothing signal of capacitor 12 is supplied to the first input side and second input side of NOR gate 14 via resistor 13. In NOR gate 14, the first signal obtained by inverting the smoothing signal is provided as shown in FIG. 5C.

The first signal of NOR gate 14 and serial data SDA are supplied to the first input side and second input side of NOR gate 15. In NOR gate 15, the first signal of NOR gate 14 and serial data SDA are subjected to an OR operation, and the resultant OR-ed signal is inverted to provide the second signal as shown in FIG. 5D.

The second signal of NOR gate 15 and serial clock SCL received via and bus 100 as shown in FIG. 5E are respectively supplied to the first input side and second input side of NAND gate 16. In NAND gate 16, serial clock SCL and the second signal are subjected to the AND operation, and the AND-ed signal is inverted to provide start signal OUT1 of high potential level as shown in FIG. 5F.

That is, if serial data SDA is triggered from the high potential level to the low potential level and serial clock SCL is of high potential level, start signal detecting section 10 produces start signal OUT1 of high potential level as shown in FIG. 5F.

Also, if start signal OUT1 of high potential level is supplied to set terminal S of busy signal generating section 30, busy signal generating section 30 triggers busy signal OUT to the high potential level as shown in FIG. 5K.

A case that serial data SDA and serial clock SCL are received into communication state sensing circuit 3 is identically operated as above. Therefore, busy signal OUT of high potential level from communication state sensing circuits 2 and 3 is supplied to respective microprocessor M12 of second auxiliary device B and microprocessor M13 of third auxiliary device C. Then, microprocessors M12 and M13 recognize the current communication network as the busy state to prepare for the reception of the data. However, since the current communication network is in the busy state, microprocessors M12 and M13 cannot transmit the data.

In addition, as shown in FIG. 5A, serial data SDA is received into NAND gate 21 of stop signal detecting section 20, and serial data SDA is inverted in NAND gate 21 to provide the third signal as shown in FIG. 5G. Thus, the third signal is supplied to resistor 22 and capacitor 23, so that resistor 22 and capacitor 23 integrate the third signal. The resultant integrated signal is supplied to NAND gate 25 via resistor 24. At this time, the third signal is as shown in FIG. 5H.

Serial data SDA and the third signal are respectively supplied to the first input side and second input side of NAND gate 25 which performs the AND operation upon serial data SDA and the third signal and inverts the AND-ed signal to produce the fourth signal as shown in FIG. 5I.

The fourth signal of NAND gate 25 and serial clock SCL are respectively supplied to the first input side and second input side of NAND gate 26 in which the fourth signal and serial clock SCL are subjected to the AND operation, and the AND-ed signal is inverted to produce stop signal OUT2 as shown in FIG. 5J.

That is, serial data SDA is triggered from the low potential level to the high potential level. When serial clock SCL is of the high potential level, stop signal detecting section 20 provides stop signal OUT2 of high potential level as shown in FIG. 5J.

Also, once stop signal OUT2 of stop signal detecting section 20 is provided to reset terminal R of busy signal generating section 30, busy signal generating section 30 triggers busy signal OUT to the low potential level as shown in FIG. 5K.

Busy signal OUT of low potential level is supplied to microprocessors M12 and M13, so that microprocessors M12 and M13 recognize the current communication network as the idle state to be ready for transmitting or receiving the data.

In other words, communication state sensing circuit 2 of second auxiliary device B and communication state sensing circuit 3 of third auxiliary device C produce busy signal OUT of high potential level. Then, busy signal OUT of high potential level is supplied to microprocessor M12 of second auxiliary device B and microprocessor M13 of third auxiliary device C, so that microprocessors M12 and M13 recognize the current communication network as the busy state to receive the data. When the data transmission is finished in first auxiliary device A to provide stop signal OUT2 of high potential level, communication state sensing circuits 2 and 3 produce busy signal OUT of low potential level which is then supplied to microprocessors M12 and M13. Thus, microprocessors M12 and M13 recognize the current communication network as the idle state to receive or transmit the data. As the result, since communication state sensing circuit 3 provides busy signal OUT of high potential level to microprocessor M13 when first auxiliary device A and second auxiliary device B are in the communicating state, microprocessor M13 cannot transmit the data.

By employing the circuit for sensing communication state according to the present invention, the data under the communication can be prevented from being destroyed when the data is transmitted to other auxiliary devices other than the operating auxiliary devices.

Although the plurality of NAND gates and OR gates are designed in the embodiment of the present invention for detecting the start signal and stop signal, other logic gates may be combined to be employed herein.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A circuit for sensing a communication state, comprising:

start signal detecting means for detecting a start signal of high potential level from a serial clock and serial data supplied via a bus, including:

a first resistor for biasing said serial data;

a first capacitor for precharging and discharging an output signal of said first resistor to smooth said output signal of said first resistor;

a second resistor connected to an output side of said first resistor for biasing a smoothing signal of said first capacitor;

a first NOR gate for inverting an output signal of said second resistor;

a second NOR gate for performing an OR operation upon a first signal from said first NOR gate and said serial data, and inverting the resultant OR-ed signal; and a first NAND gate for performing the AND operation upon a second signal from said second NOR gate and a serial clock, and inverting the resultant AND-ed signal to provide a start signal;

stop signal detecting means for determining a stop signal of low potential level from said serial clock and serial data;

busy signal generating means for determining a level of a busy signal in accordance with levels of said start signal and stop signal of said signal detecting means; and a microprocessor for controlling the transmission/reception of said serial data and serial clock in accordance with said level of said busy signal of said busy signal generating means.

2. The circuit for sensing a communication state as claimed in claim 1, wherein said stop signal detecting means comprises:

a second NAND gate for inverting said serial data;

a third resistor for biasing an output signal of said second NAND gate;

a second capacitor for precharging and discharging an output signal of said third resistor to smooth said output signal of said third resistor;

a fourth resistor for biasing an output signal of said second capacitor;

a third NAND gate for performing the AND operation upon an output signal of said fourth resistor and said serial data, and inverting the resultant AND-ed signal to provide a third signal; and a fourth NAND gate for performing the AND operation upon said third signal and serial clock, and inverting the resultant AND-ed signal to provide said stop signal.

3. The circuit for sensing a communication state as claimed in claim 1, wherein said busy signal generating means is comprised of a flip-flop for providing the busy signal of high potential level when said start signal of high potential level is received, and providing the busy signal of low potential level when said stop signal of high potential level is received.

4. A circuit for sensing a communication state comprising:

start signal detecting means for detecting a start signal of high potential level from a serial clock and serial data supplied via a bus;

stop signal detecting means for detecting a stop signal of low potential level from said serial clock and serial data;

busy signal generating means for determining a level of a busy signal in accordance with said levels of said start signal of said start signal detecting means and of said stop signal of said stop signal detecting means; and a microprocessor for controlling the transmission/reception of said serial data and serial clock in accordance with said level of said busy signal of said busy signal generating means.

5. The circuit for sensing a communication state as claimed in claim 4, wherein said busy signal generating means is comprised of a flip-flop for providing the busy signal of high potential level when the start signal of high potential level is received, and providing the busy signal of low potential level when the stop signal of low potential level is received.

* * * * *